United States Patent
Kim

(10) Patent No.: US 9,942,877 B2
(45) Date of Patent: Apr. 10, 2018

(54) MULTICASTING METHOD AND SYSTEM

(75) Inventor: Duk Kyung Kim, Incheon (KR)

(73) Assignee: INHA-INDUSTRY PARTNERSHIP INSTITUTE, Incheon (KR)

( * ) Notice: Subject to any disclaimer, the term of this patent is extended or adjusted under 35 U.S.C. 154(b) by 0 days.

(21) Appl. No.: 13/580,621

(22) PCT Filed: Oct. 17, 2011

(86) PCT No.: PCT/KR2011/007711
§ 371 (c)(1),
(2), (4) Date: Aug. 22, 2012

(87) PCT Pub. No.: WO2013/058414
PCT Pub. Date: Apr. 25, 2013

(65) Prior Publication Data
US 2013/0094478 A1 Apr. 18, 2013

(51) Int. Cl.
*H04W 72/04* (2009.01)
*H04W 72/00* (2009.01)
*H04L 1/00* (2006.01)
*H04L 27/34* (2006.01)
*H04W 88/04* (2009.01)

(52) U.S. Cl.
CPC ......... *H04W 72/005* (2013.01); *H04L 1/0003* (2013.01); *H04L 27/3488* (2013.01); *H04L 2001/0093* (2013.01); *H04L 2001/0097* (2013.01); *H04W 88/04* (2013.01)

(58) Field of Classification Search
CPC .... H04W 72/08; H04W 84/047; H04B 7/024; H04B 7/15592
See application file for complete search history.

(56) References Cited

U.S. PATENT DOCUMENTS

| 2002/0197969 | A1 | 12/2002 | Moon et al. |
| 2007/0054624 | A1 | 3/2007 | Kashiwagi |
| 2008/0025323 | A1* | 1/2008 | Khan ............................ 370/400 |
| 2008/0170540 | A1* | 7/2008 | Fukuda ................. H04B 3/542 370/328 |
| 2008/0219222 | A1 | 9/2008 | Lo et al. |
| 2009/0147746 | A1 | 6/2009 | Alay et al. |

(Continued)

FOREIGN PATENT DOCUMENTS

| CN | 1394092 A | 1/2003 |
| EP | 2182662 A1 | 5/2010 |

(Continued)

OTHER PUBLICATIONS

International Search Report and Written Opinion from International Application No. PCT/KR2011/007711 dated May 29, 2012.

(Continued)

*Primary Examiner* — Rhonda Murphy
(74) *Attorney, Agent, or Firm* — Brundidge & Stanger, P.C.

(57) ABSTRACT

Technologies are generally described for providing multicasting services. In some examples, a method performed under control of a first user equipment may include receiving a first level of signal and a second level of signal from a base station during a first time slot and transmitting the second level of signal to a second user equipment during a second time slot.

15 Claims, 8 Drawing Sheets

(56) References Cited

U.S. PATENT DOCUMENTS

2010/0120360 A1* 5/2010 Haustein et al. ............... 455/15
2011/0176477 A1  7/2011 Lee et al.

FOREIGN PATENT DOCUMENTS

| JP | 2010068524 A | 3/2010 |
|---|---|---|
| JP | 2011526116 A | 9/2011 |
| KR | 1020090118058 A | 11/2009 |
| KR | 10-2010-0095650 | 8/2010 |
| KR | 10-2011-0025657 | 3/2011 |
| WO | 2007029745 A1 | 3/2007 |
| WO | 2010039013 A2 | 4/2010 |

OTHER PUBLICATIONS

Alay, et al., "Layered Wireless Video Multicast using Directional Relays", Dept. of Electrical and Computer Engineering, Polytechnic University, Brooklyn, NY.

Alay, et al., "Layered Wireless Video Multicast using Omni-Directional Relays", 2008, IEEE, pp. 2149-2152.

Wang, et al., "Multi-Tier Cooperative Broadcasting with Hierarchical Modulations", IEEE, vol. 6, No. 8, Aug. 2007, pp. 3047-3057.

Jung, et al., "Study Report on Hierarchical Networks (Revised Working Group)" IEEE 802.16 Broadband Wireless Access Working Group, Nov. 2010.

DK Kim et al, "Performance Enhancement using Hierarchical Modulation in Distributed Relaying Systems", J. of Kics, vol. 34, No. 1, pp. 18-26, 2009.

J. She, et al., "IPTV over WIMAX: Key Success Factors, Challenges, and Solutions", IEEE Communications Magazine, vol. 45, pp. 87-93, Aug. 2007, pp. 87-93.

Shin, J. and Song, J. "Dual-Hop Transmission Scheme Based on Hierarchical Modulation in Wireless Networks," IEICE Trans. Commun., vol. E93-B, No. 6, pp. 1645-1648 (Jun. 2010).

European Search Report for counterpart Patent Application No. 11874270.9 dated May 4, 2015.

* cited by examiner

[Fig. 1]
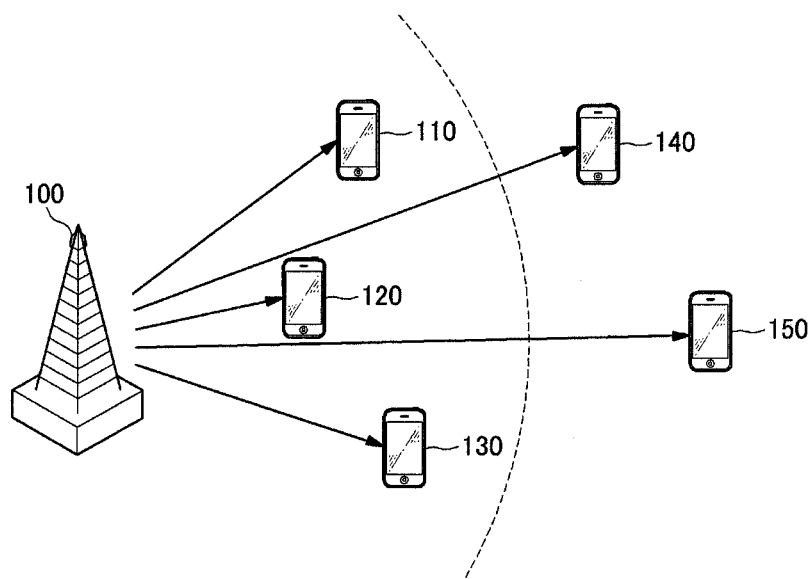
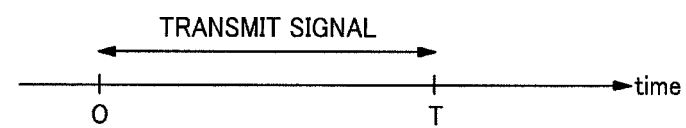
[Fig. 2]
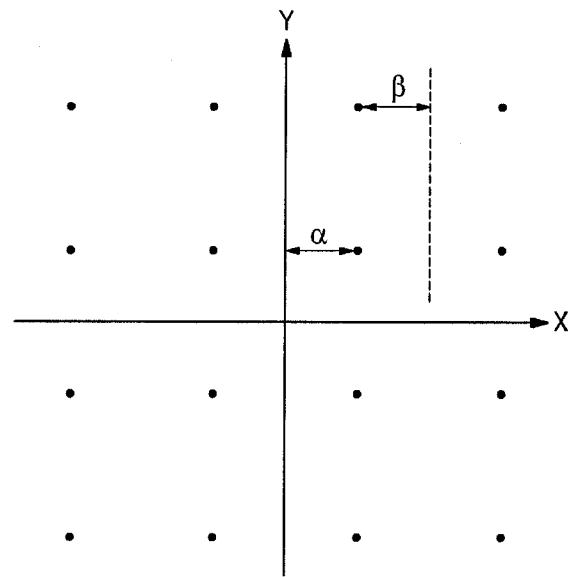

[Fig. 3a]
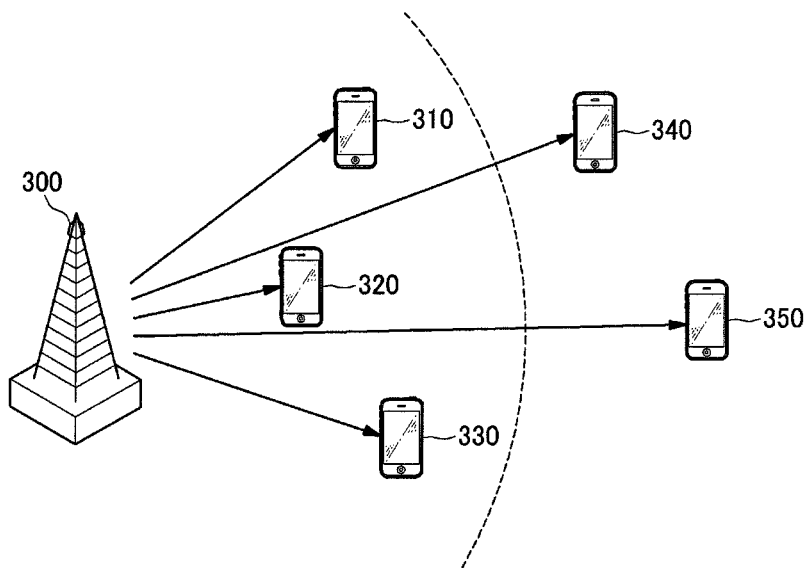
[Fig. 3b]
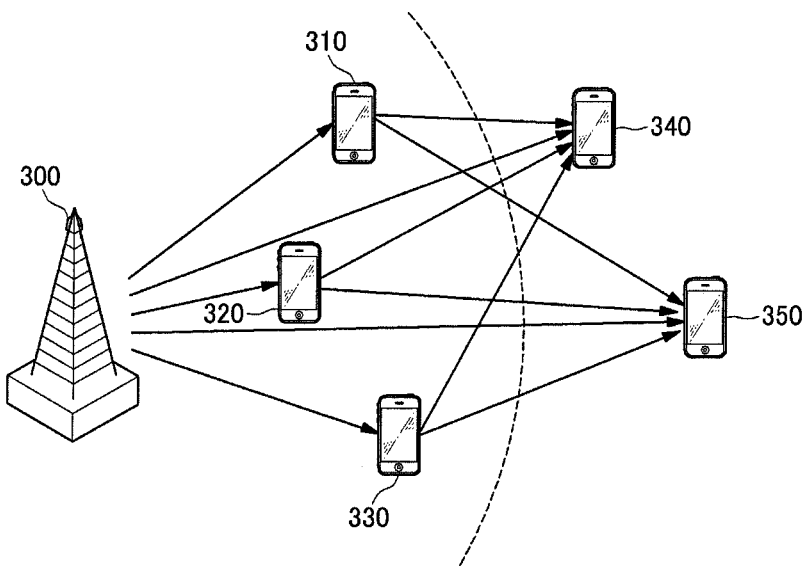
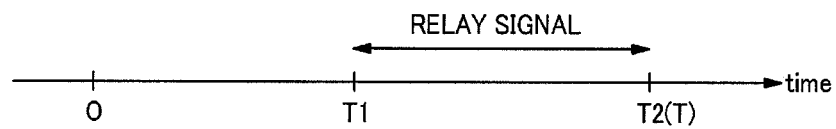

[Fig. 4]
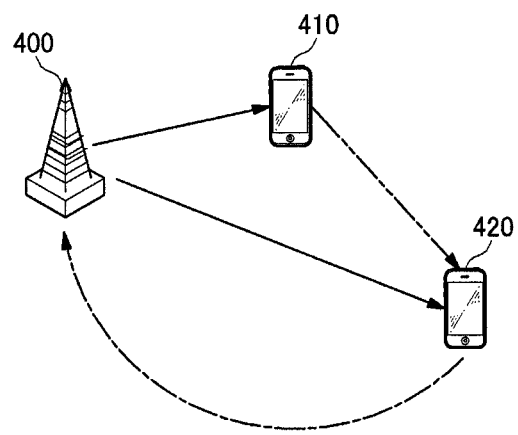
[Fig. 5]
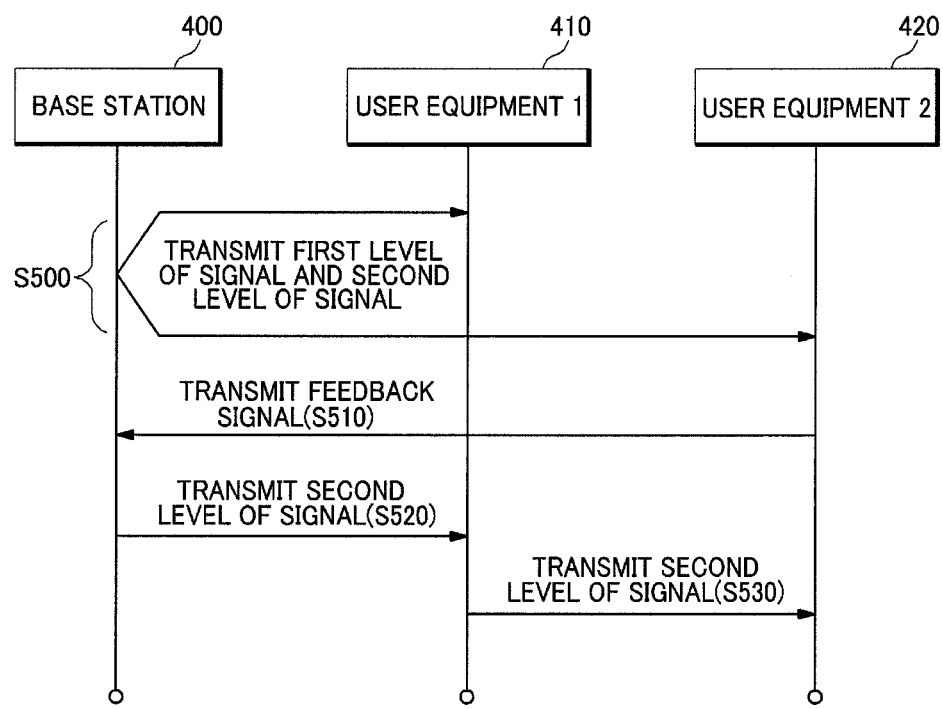

[Fig. 6]
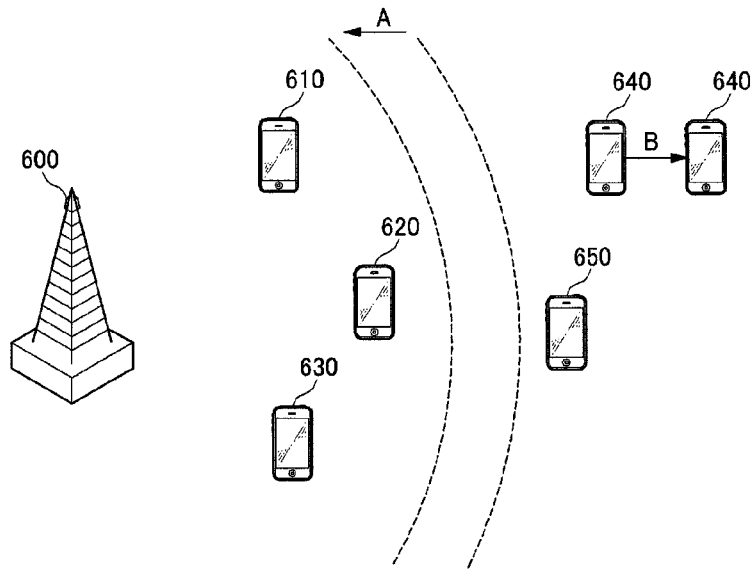
[Fig. 7]
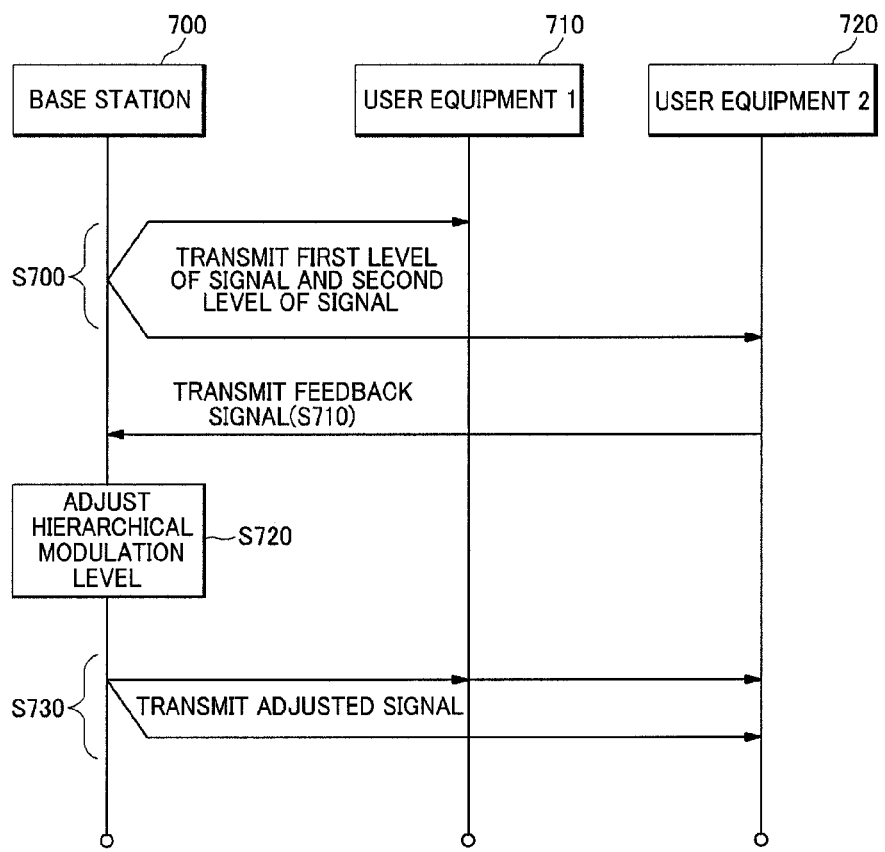

[Fig. 8]
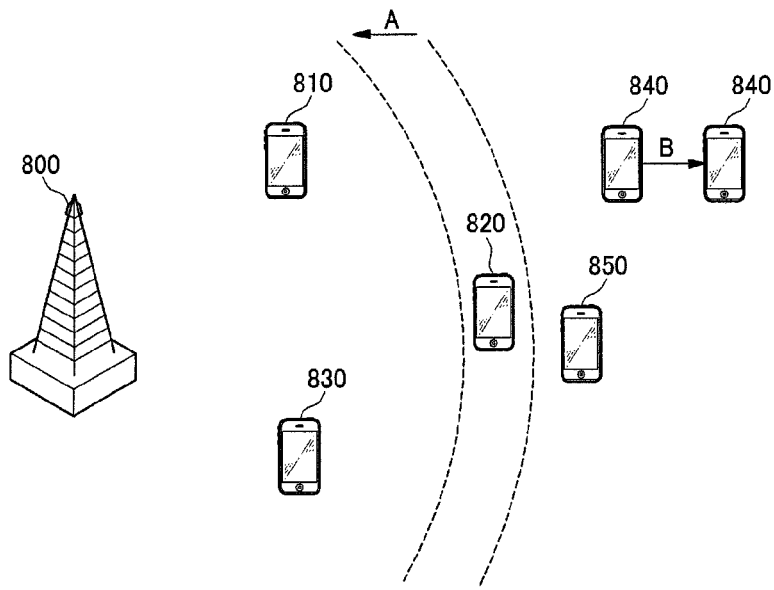
[Fig. 9]
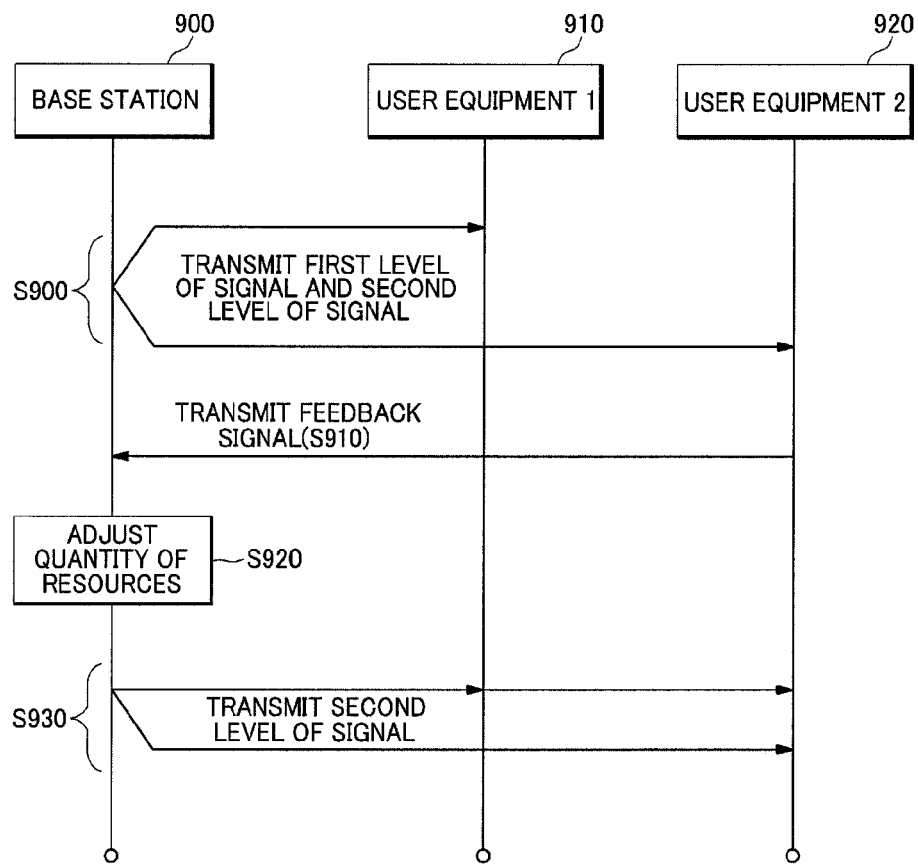

[Fig. 10]
1000
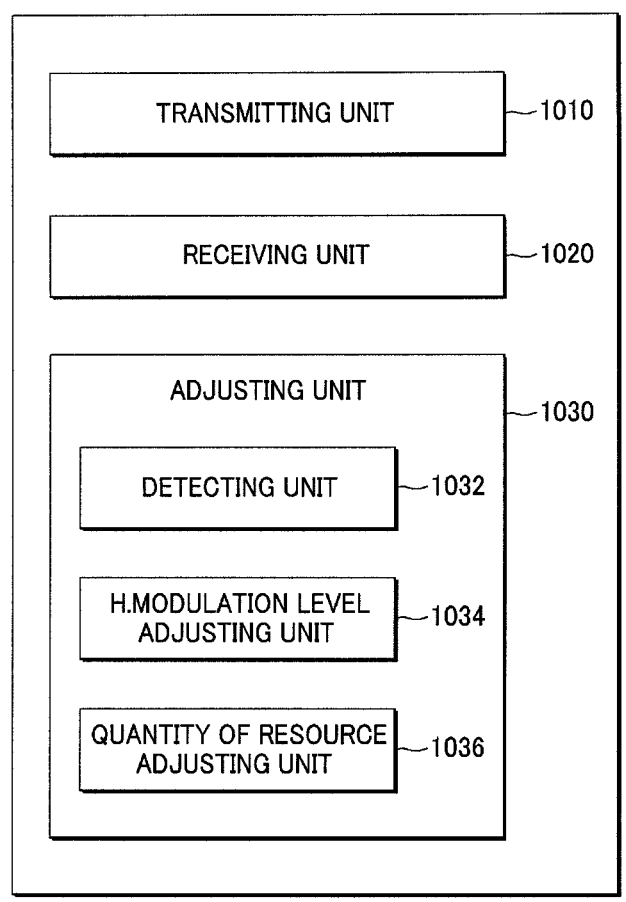

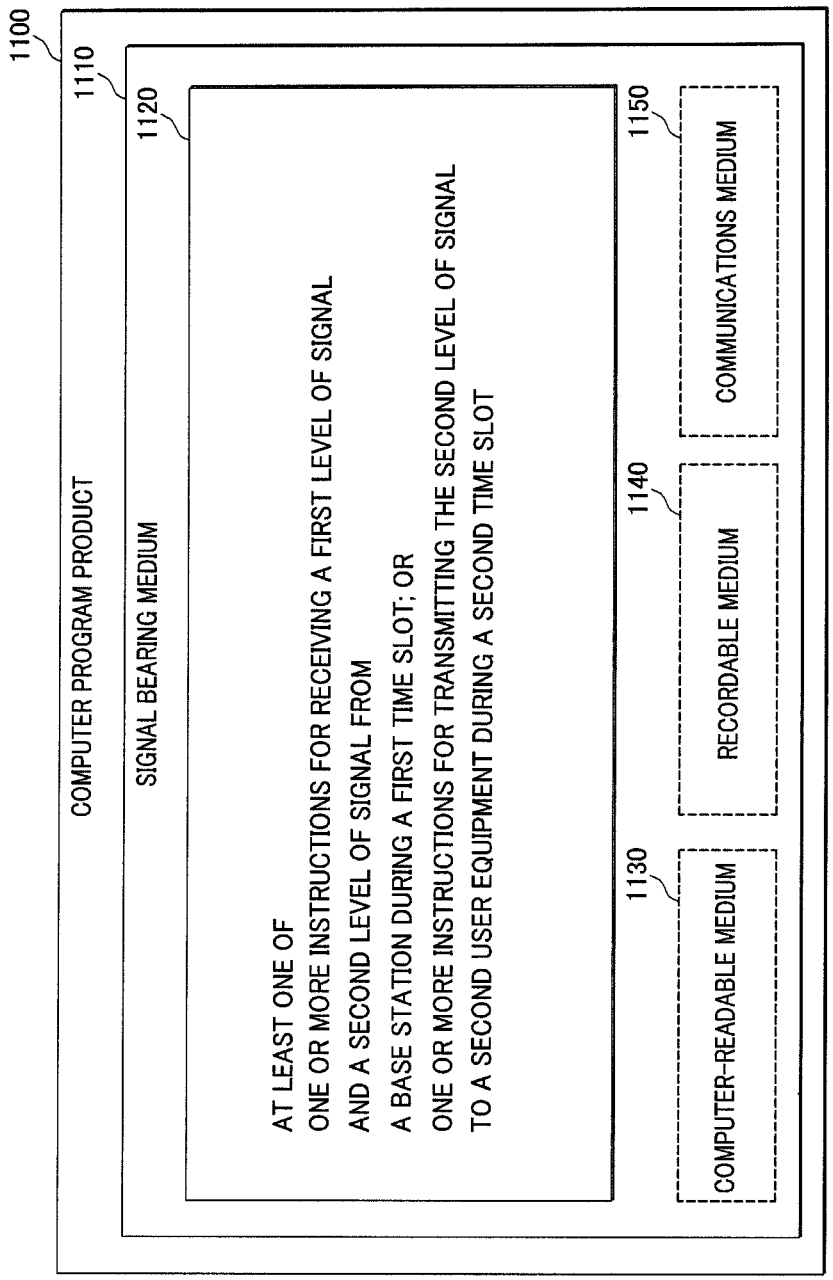

[Fig. 12]
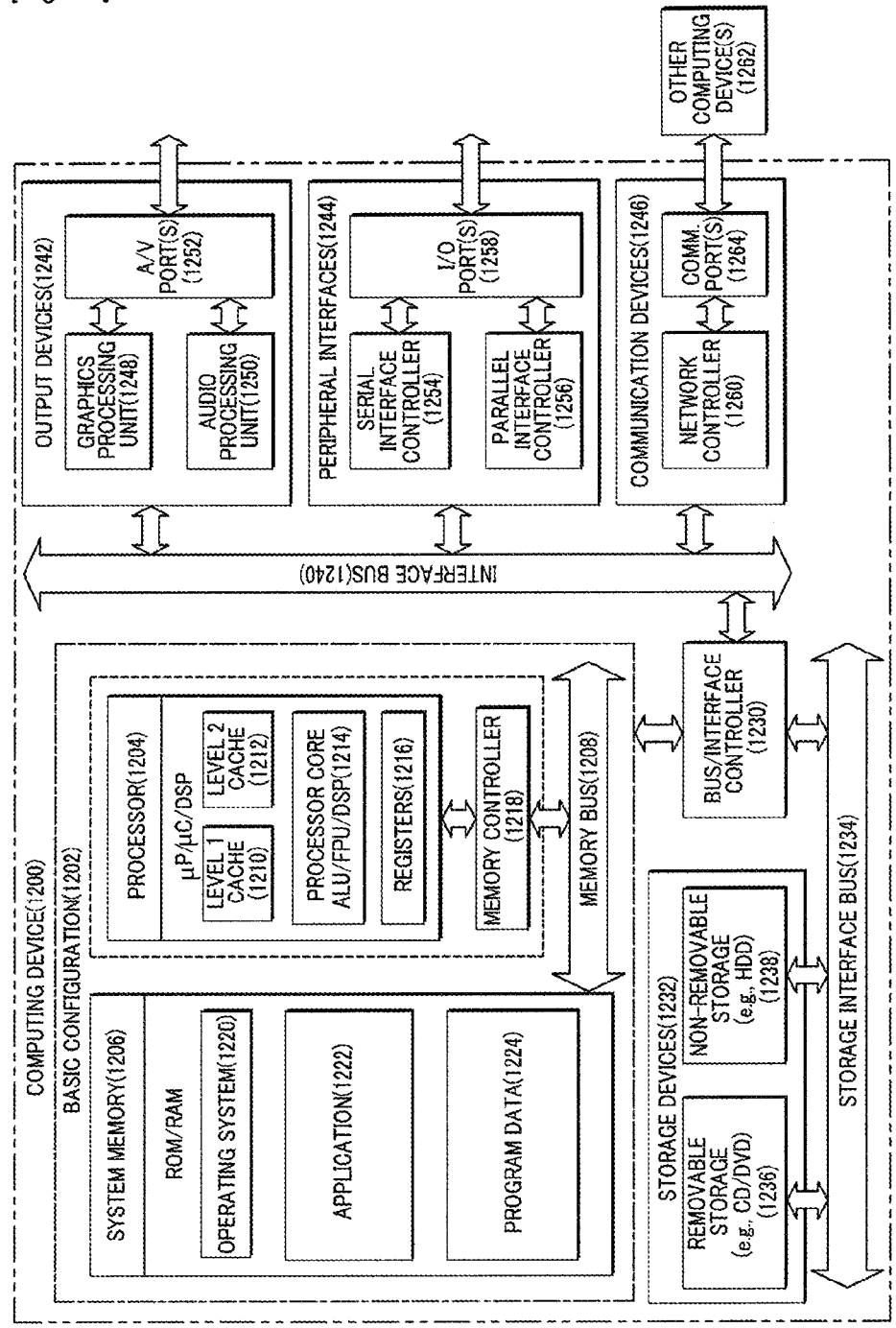

MULTICASTING METHOD AND SYSTEM

CROSS-REFERENCE TO RELATED APPLICATION

This application is a U.S. National Stage filing under 35 U.S.C. § 371 of International Application No. PCT/KR2011/007711, filed on Oct. 17, 2011. The disclosure of the International Application is hereby incorporated herein by reference in its entirety.

BACKGROUND ART

With a development of a multimedia service for such as media streaming, a video conference or video on demand, a multicasting service has become an important service on wireless networks. The multicasting service is a one-to-many multi-party communication mode. It reduces consumption of network resources in a multi-party communication. Recently, multicasting service providers are paying more and more attention to how to efficiently manage multicast users and network resources so as to make the multicasting service reliable and diversified.

DISCLOSURE OF INVENTION

Solution to Problem

In an example, a method performed under control of a first user equipment may include receiving a first level of signal and a second level of signal from a base station during a first time slot and transmitting the second level of signal to a second user equipment during a second time slot.

In an example, a method performed under control of a base station may include transmitting a first level of signal and a second level of signal to a multiple number of user equipments during a first time slot, receiving a first feedback signal from a first user equipment when the first user equipment does not receive the second level of signal during the first time slot, adjusting a hierarchical modulation level of the second level of signal and transmitting the adjusted second level of signal to the first user equipment during a second time slot.

In an example, a base station may include a transmitting unit configured to transmit a first level of signal and a second level of signal to a multiple number of user equipments, a receiving unit configured to receive a first feedback signal from a user equipment and an adjusting unit configured to adjust a hierarchical modulation level of the second level of signal based on the first feedback signal. The transmitting unit is further configured to transmit the adjusted second level of signal to the user equipment.

In an example, a computer-readable storage medium having stored thereon computer-executable instructions that, in response to execution, cause a first user equipment to perform operations including receiving a first level of signal and a second level of signal from a base station during a first time slot and transmitting the second level of signal to a second user equipment during a second time slot.

In an example, a computer-readable storage medium having stored thereon computer-executable instructions that, in response to execution, cause a base station to perform operations including transmitting a first level of signal and a second level of signal to a multiple number of user equipments during a first time slot, receiving a first feedback signal from a first user equipment when the first user equipment does not receive the second level of signal during the first time slot, adjusting a hierarchical modulation level of the second level of signal and transmitting the adjusted second level of signal to the first user equipment during a second time slot.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 is a schematic view of a conventional multicasting system;

FIG. 2 is a schematic graph used to explain a hierarchical modulation method;

FIGS. 3A and 3B are schematic views of a multicasting system;

FIG. 4 is a schematic view of a multicasting system for explaining an embodiment of the present disclosure;

FIG. 5 is a schematic diagram of a signal flow between a base station and user equipments, in accordance with an embodiment of the present disclosure;

FIG. 6 is a schematic view of a multicasting system for explaining another embodiment of the present disclosure;

FIG. 7 is a schematic diagram of a signal flow between a base station and user equipments in accordance with another embodiment of the present disclosure;

FIG. 8 is a schematic view of a multicasting system for explaining another embodiment of the present disclosure;

FIG. 9 is a schematic diagram of a signal flow between a base station and user equipments in accordance with another embodiment of the present disclosure;

FIG. 10 is a schematic diagram illustrating a base station in accordance with an embodiment of the present disclosure;

FIG. 11 illustrates computer program products that can be utilized to provide multicasting services in accordance with at least some embodiments described herein; and FIG. 12 is a block diagram illustrating an example computing device that can be utilized to provide multicasting services in accordance with at least some embodiments described herein.

MODE FOR THE INVENTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to providing multicasting services.

Briefly stated, technologies are generally described for providing multicasting services. In some examples, a base station transmits a first level of signal and a second level of signal to a first user equipment and a second user equipment during a first time slot. By way of example, but not limitation, if the second user equipment does not receive the second level of signal during the first time slot, the first user equipment transmits the second level of signal to the second user equipment as a relay during a second time slot.

FIG. 1 is a schematic view of a conventional multicasting system. A base station 100 may transmit a signal to a multiple number of user equipments 110, 120, 130, 140 and 150 at the same time during a time slot T. By way of example, but not limitation, the signal may include video streams, video signals or audio signals. Due to the nature of a wireless communication system, as user equipments 110, 120, 130, 140 and 150 are distanced from base station 100, a channel quality of user equipments 110, 120, 130, 140 and 150 may decline. Generally, a channel quality of a user equipment in the vicinity of a boundary of a network cell covered by a single base station, out of the boundary or in a shadow area is not high, and thus, such user equipment may not fully receive the signal from the base station. By way of example, referring to FIG. 1, user equipments 110, 120 and 130 are in the vicinity of base station 100. Thus, a channel quality of user equipments 110, 120 and 130 may be high. However, user equipments 140 and 150 are deviated from a boundary (dotted line) of a network cell of base station 100, and thus, a channel quality of user equipments 140 and 150 may be low.

In some embodiments, base station 100 may transmit a signal to user equipments 110, 120, 130, 140 and 150 by using a hierarchical modulation method. In the hierarchical modulation method, when signals are transmitted through a single channel, such signals may be modulated by respective modulation methods.

FIG. 2 is a schematic graph used to explain a hierarchical modulation method in accordance with at least some embodiments described herein. As depicted in FIG. 2, there are four signal points in each quadrant of coordinates. In FIG. 2, an α value denotes a distance between a signal point near the Y-axis and the Y-axis, and a β value denotes a half of distance between signal points in a quadrant. In accordance with the hierarchical modulation method, a modulation method of a signal may be determined by adjusting a hierarchical modulation level. The hierarchical modulation level indicates an α/β value. By way of example, if the α value is equivalent to the β value, the signal may be modulated by a 16 QAM modulation method. If the α value is greater than the β value, the signal may be modulated by a QPSK modulation method. When the signal is transmitted by using the hierarchical modulation method, if a channel quality of a user equipment is high, the user equipment can accurately demodulate and detect sixteen signal points, and if the channel quality of the user equipment is not high, the user equipment can detect which quadrant signal points are positioned in.

In some embodiments, base station 100 may transmit a signal containing an image to user equipments 110, 120, 130, 140 and 150 by a scalable video coding method. In the scalable video coding method, a signal may be transmitted as being divided into multiple levels. If a user equipment receives all the levels of signal, an image of high definition and high resolution may be obtained. If the user equipment receives some of the levels of signal, an image of low resolution may be obtained.

As described above, base station 100 may transmit signals to user equipments 110, 120, 130, 140 and 150 based on the hierarchical modulation method and the scalable video coding method. By way of example, but not limitation, a first level of signal may be modulated by the QPSK modulation method and a second level of signal may be modulated by the 16 QAM modulation method.

FIGS. 3A and 3B are schematic views of a multicasting system in accordance with at least some embodiments described herein. A base station 300 may transmit a signal to a multiple number of user equipments 310, 320, 330, 340 and 350 at the same time during a time slot T1. As explained with reference to FIGS. 1 and 2, base station 300 may transmit the signal to user equipments 310, 320, 330, 340 and 350 based on the hierarchical modulation method and the scalable video coding method. By way of example, base station 300 may transmit the signal divided into a first level of signal and a second level of signal. The first level of signal may be modulated by the QPSK modulation method and the second level of signal may be modulated by the 16 QAM modulation method.

Since user equipments 310, 320 and 330 are close to base station 300, a channel quality of user equipments 310, 320 and 330 may be high. That is, SINR values of channels of user equipments 310, 320 and 330 may be higher than a predetermined value. Thus, user equipments 310, 320 and 330 may receive both the first level of signal and the second level of signal during the time slot T1. Therefore, user equipments 310, 320 and 330 may accurately demodulate and detect sixteen signal points (as described with reference to FIG. 2 above) without an error.

Meanwhile, user equipments 340 and 350 may be distanced from base station 300. By way of example, user equipments 340 and 350 may be out of a boundary (dotted line) of a network cell of base station 300. Therefore, a channel quality of user equipments 340 and 350 may be low. That is, SINR values of channels of user equipments 340, 350 may be lower than a predetermined value. Thus, user equipments 340, 350 may receive only the first level of signal during the time slot T1. Since user equipments 340 and 350 may not receive the second level of signal, user equipments 340 and 350 may not accurately demodulate sixteen signal points but can detect which quadrant the signal points are positioned in.

As depicted in FIG. 3B, user equipments 310, 320 and 330 may transmit a signal to user equipments 340 and 350 during a time slot T2. User equipments 310, 320 and 330 which receive both the first level of signal and the second level of signal during the time slot T1 may serve as a relay. User equipments 310, 320 and 330 may transmit the second level of signal (which user equipments 340 and 350 could not receive during the time slot T1) to user equipments 340 and 350 during the time slot T2.

If user equipments 340 and 350 do not receive the second level of signal during time slot T1, user equipments 340 and 350 may transmit a feedback signal to base station 300. In some embodiments, the feedback signal may be transmitted by using a 1-bit symbol such as + and −. By way of example, but not limitation, the plus (+) feedback signal indicates that user equipments 340 and 350 do not receive the second level of signal during the time slot T1, and the minus (−) feedback signal indicates that user equipments 340 and 350 receive both the first level of signal and the second level of signal during the time slot T1. In some embodiments, only when user equipments 340 and 350 do not receive the second level of signal during the time slot T1, the feedback signal may be transmitted to base station 300. Although the feedback signal is described to be transmitted by using a 1-bit symbol, it will be apparent to those skilled in the art that a method for transmitting the feedback signal is not limited thereto but may be of various ways.

If base station 300 receives the feedback signal from user equipments 340 and 350, base station 300 may give an instruction to user equipments 310, 320 and 330 to relay the second level of signal to user equipments 340 and 350. Base station 300 may give an instruction to user equipments 310, 320 and 330 based on a general method such as wireless communication.

Although it has been explained that user equipments 340 and 350 that do not receive the second level of signal during the time slot T1 may transmit the feedback signal to base station 300, the present disclosure is not limited thereto. In some embodiments, user equipments 340 and 350 that do not receive the second level of signal during the time slot T1 may transmit the feedback signal directly to user equipments 310, 320 and 330, and upon receiving the feedback signal, user equipments 310, 320 and 330 may relay the second level of signal to user equipments 340 and 350.

If user equipments 310, 320 and 330 receive a relay instruction from base station 300, user equipments 310, 320 and 330 may transmit the second level of signal to user equipments 340 and 350 during the time slot T2. Base station 300 may also transmit the second level of signal directly to user equipments 340 and 350 during the time slot T2. Thus, user equipments 340 and 350 may receive both the first level of signal and the second level of signal during a time slot T which is comprised of the time slot T1 and the time slot T2.

FIG. 4 is a schematic view of a multicasting system for explaining an embodiment of the present disclosure, and FIG. 5 is a schematic diagram of a signal flow between a base station and user equipments in accordance with an embodiment of the present disclosure. Hereinafter, the signal flow of FIG. 5 will be described with reference to FIG. 4. A base station 400 may transmit a first level of signal and a second level of signal to a first user equipment 410 and a second user equipment 420 during a first time slot (S500, indicated by unbroken-line arrows in FIG. 4). It may be assumed that first user equipment 410 is close to base station 400 and second user equipment 420 is distanced from base station 400.

Base station 400 may transmit the first level of signal and the second level of signal based on a hierarchical modulation method and a scalable video coding method. Since second user equipment 420 is distanced from base station 400, a SINR value of a channel of second user equipment 420 may be lower than a predetermined value. Thus, second user equipment 420 may not receive the second level of signal during the first time slot. At this time, second user equipment 420 may transmit a feedback signal to base station 400 (S510, indicated by a dashed-dotted-line arrow in FIG. 4).

If base station 400 receives the feedback signal, base station 400 may give an instruction to first user equipment 410 to relay the second level of signal to second user equipment 420. Further, base station 400 may transmit the second level of signal to first user equipment 410 such that first user equipment 410 transmits the second level of signal to second user equipment 420 again (S520).

First user equipment 410 may transmit the second level of signal to second user equipment 420 during a second time slot (S530, indicated by a dashed-double-dotted-line arrow in FIG. 4). Since second user equipment 420 receives the second level of signal that cannot be received during the first time slot from first user equipment 410, second user equipment 420 may receive both the first level of signal and the second level of signal. Although not depicted in FIGS. 4 and 5, base station 400 may also transmit the second level of signal to second user equipment 420 during the second time slot.

FIG. 6 is a schematic view of a multicasting system for explaining another embodiment of the present disclosure. A base station 600 may transmit a signal to a multiple number of user equipments 610, 620, 630, 640 and 650 at the same time based on a scalable video coding method and a hierarchical modulation method. In some embodiments, base station 600 may transmit a first level of signal and a second level of signal to user equipments 610, 620, 630, 640 and 650 during a first time slot. By way of example, the first level of signal may be modulated by the QPSK modulation method and the second level of signal may be modulated by the 16 QAM modulation method. Since user equipments 610, 620 and 630 are positioned within a network cell (dotted line) of base station 600, user equipments 610, 620 and 630 may receive both the first level of signal and the second level of signal. Further, since user equipments 640 and 650 are out of the network cell (dotted line) of base station 600, user equipments 640 and 650 may receive only the first level of signal.

In some embodiments, if the network cell of base station 600 becomes narrow (indicated by an arrow A), user equipments 640 and 650 may become more distanced from a range capable of receiving both the first level of signal and the second level of signal. Further, if user equipment 640 moves away from base station 600 (indicated by an arrow B), a channel quality of user equipment 640 may further decline. Thus, user equipment 640 even may not detect which quadrant the signal points are positioned in.

If user equipment 640 do not receive the second level of signal (and the channel quality of user equipment 640 further declines), user equipment 640 may transmit a feedback signal to base station 600. If base station 600 receives the feedback signal from user equipment 640, base station 600 may adjust a hierarchical modulation level of the second level of signal. The hierarchical modulation level may be indicated by an α/β value. Base station 600 may increase the hierarchical modulation level such that user equipment 640 can detect which quadrant signal points are positioned in. That is, base station 600 may decrease a β value and increase an α value so as to modulate the second level of signal by the QPSK modulation method. If the β value is decreased and the α value is increased, a distance between signal points in the same quadrant may become small but a distance between signal points in different quadrants may become great. Therefore, user equipment 640 can detect which quadrant the signal point is positioned in.

During a second time slot, base station 600 may transmit the adjusted second level of signal to user equipments 610, 620 and 630. User equipments 610, 620 and 630 may transmit to user equipments 640 and 650 the adjusted second level of signal received from base station 600 as a relay during the second time slot. Further, base station 600 may also transmit the adjusted second level of signal to user equipments 640 and 650 during the second time slot.

FIG. 7 is a schematic diagram of a signal flow between a base station and user equipments in accordance with another embodiment of the present disclosure. A base station 700 may transmit a first level of signal and a second level of signal to a first user equipment 710 and a second user equipment 720 during a first time slot (S700). It may be assumed that first user equipment 710 is close to base station 700 and second user equipment 720 is distanced from base station 700. Base station 700 may transmit the first level of signal and the second level of signal based on a hierarchical modulation method and a scalable video coding method.

Since second user equipment 720 is distanced from base station 700, second user equipment 720 cannot receive the second level of signal during the first time slot. If a network cell of base station 700 becomes narrow, second user equipment 720 may become more distanced from base station 700. By way of example, if second user equipment 720 is more distanced from base station 700, a channel quality of second user equipment 720 may be lower and second user equipment 720 may not even detect which quadrant a signal point is positioned in.

Then, second user equipment 720 may transmit a feedback signal to base station 700 (S710). If base station 700 receives the feedback signal from second user equipment 720, base station 700 may adjust a hierarchical modulation level of the second level of signal (S720). By way of example, but not limitation, base station 700 may decrease a β value and increase an α value so that the second level of signal can be modulated by the QPSK modulation method.

Base station 700 may transmit the adjusted second level of signal to first user equipment 710, and first user equipment 710 may transmit the adjusted second level of signal received from base station 700 to second user equipment 720 during a second time slot as a relay (S730). Further, base station 700 may also transit the adjusted second level of signal to second user equipment 720. Since second user equipment 720 receives the adjusted second level of signal, second user equipment 720 may detect a quadrant to which a signal point belongs.

FIG. 8 is a schematic view of a multicasting system for explaining another embodiment of the present disclosure. A base station 800 may transmit signals to user equipments 810, 820, 830, 840 and 850 based on a scalable video coding method and a hierarchical modulation method. By way of example, base station 800 may transmit a first level of signal and a second level of signal to user equipments 810, 820, 830, 840 and 850 during a first time slot. Since user equipments 810, 820 and 830 may receive both the first level of signal and the second level of signal, user equipments 810, 820 and 830 may relay the signal to user equipments 840 and 850.

In some embodiments, if a network cell of base station 800 becomes narrow (indicated by an arrow A), user equipment 820 may not receive the first level of signal and the second level of signal at the same time during the first time slot. Further, user equipments 840 and 850 may be more distanced from a boundary line within which both the first level of signal and the second level of signal are received. If user equipment 820 does not receive the first level of signal and the second level of signal at the same time, user equipment 820 cannot relay a signal to user equipments 840 and 850. Therefore, a quantity of resources assigned to transmit the signal to user equipments 840 and 850 may become small. Further, if user equipment 840 is more distanced from base station 800 (indicated by an arrow B), a channel quality of user equipment 840 may further decline. Thus, user equipment 840 may not receive the first level of signal as well as the second level of signal.

If user equipment 840 does not receive the first level of signal and the second level of signal, user equipment 840 may transmit a feedback signal to base station 800. If base station 800 receives the feedback signal from user equipment 840, base station 800 adjusts a quantity of resources that are assigned to a second time slot. If user equipment 820 does not receive the first level of signal and the second level of signal at the same time, user equipment 820 cannot relay a signal to user equipments 840 and 850 during the second time slot. Thus, the number of user equipments serving as a relay may be decreased and the quantity of resources that are assigned to the second time slot needs to be increased.

Base station 800 may transmit the second level of signal to user equipments 810 and 830 that received both the first level of signal and the second level of signal during the second time slot. User equipments 810 and 830 may transmit the second level of signal received from base station 800 to user equipments 820, 840 and 850 as a relay. Further, base station 800 may also transmit the second level of signal to user equipments 820, 840 and 850.

FIG. 9 is a schematic diagram of a signal flow between a base station and user equipments in accordance with another embodiment of the present disclosure. A base station 900 may transmit a first level of signal and a second level of signal to a first user equipment 910 and a second user equipment 920 during a first time slot (S900). It may be assumed that first user equipment 910 is close to base station 900 and second user equipment 920 is distanced from base station 900. Base station 900 may transmit the first level of signal and the second level of signal based on a hierarchical modulation method and a scalable video coding method.

When a network cell of base station 900 becomes narrow, second user equipment 920 may be more distanced from base station 900. Further, the number of user equipments capable of relaying a signal to second user equipment 920 may be decreased and the quantity of resources that are assigned to signal transmission may also be decreased. A channel quality of second user equipment 920 may further decline. Thus, second user equipment 920 may not receive the first level of signal and the second level of signal. If second user equipment 920 does not receive the first level of signal and the second level of signal, second user equipment 920 may transmit a feedback signal to base station 900 (S910).

If base station 900 receives the feedback signal from second user equipment 920, base station 900 adjusts a quantity of resources that are assigned to a second time slot (S920). If a range capable of receiving both the first level of signal and the second level of signal from base station 900 becomes narrow, the number of user equipments capable of relaying signals to second user equipment 920 may be decreased and the quantity of resources that are assigned to the second time slot needs to be increased.

Base station 900 may transmit the second level of signal to first user equipment 910 by using the adjusted resources, and first user equipment 910 may transmit the second level of signal received from base station 900 to second user equipment 920 during the second time slot as a relay (S930). Further, base station 900 may also transmit the second level of signal to second user equipment 920 by using the adjusted resources.

It has been explained that a signal is transmitted as being divided into two levels, but the signal may be divided into three or more levels. Further, it has been explained that the number of time slots is two, but it may be three or more depending on the number of levels of the signal.

FIG. 10 is a schematic diagram illustrating a base station in accordance with an embodiment of the present disclosure. As depicted in FIG. 10, base station 1000 may include a transmitting unit 1010, a receiving unit 1020 and an adjusting unit 1030. Adjusting unit 1030 may include a detecting unit 1032, a hierarchical modulation level adjusting unit 1034 and a quantity of resources adjusting unit 1036. Transmitting unit 1010 may transmit a first level of signal and a second level of signal to a multiple number of user equipments. Transmitting unit 1010 may transmit the first level of signal and the second level of signal based on a scalable video coding method and a hierarchical modulation method. By way of example, the first level of signal may be modulated by a QPSK modulation method and the second level of signal may be modulated by a 16 QAM modulation method.

Receiving unit 1020 may receive a feedback signal from a user equipment. If the user equipment does not receive the second level of signal from base station 1000, the user equipment may transmit the feedback signal to receiving unit 1020. Further, if the user equipment becomes more distanced from base station 1000 and does not detect which quadrant a signal point is positioned in, the user equipment may transmit the feedback signal to receiving unit 1020. If the user equipment becomes more distanced from base station 1000 and does not receive the first level of signal and the second level of signal, the user equipment may transmit the feedback signal to receiving unit 1020.

Adjusting unit 1030 may adjust a hierarchical modulation level of the second level of signal and a quantity of resources that are assigned to a signal transmission based on the feedback signal. Detecting unit 1032 may determine a kind of the feedback signal received from the user equipment. By way of example, but not limitation, detecting unit 1032 may determine whether the user equipment does not receive the second level of signal and thus cannot detect which quadrant signal points are positioned in or the user equipment cannot receive the first level of signal and the second level of signal.

If the user equipment transmit the feedback signal since the user equipment cannot receive the second level of signal and thus cannot detect which quadrant the signal points are positioned in, hierarchical modulation level adjusting unit 1034 may adjust a hierarchical modulation level of the second level of signal. Transmitting unit 1010 may transmit the second level of signal adjusted by hierarchical modulation level adjusting unit 1034 to the user equipment. Since the user equipment receives the adjusted second level of signal, the user equipment may detect which quadrant signal points are positioned in.

If the user equipment transmits the feedback signal since the user equipment does not receive the first level of signal and the second level of signal, quantity of resources adjusting unit 1036 may adjust the quantity of resources that are assigned to a signal transmission. Since quantity of resources adjusting unit 1036 adjusts the quantity of resources that are assigned to the signal transmitted by transmitting unit 1010, the number of user equipments capable of receiving the first level of signal and the second level of signal may be increased.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 11 illustrates computer program products 1100 that can be utilized to provide multicasting services in accordance with at least some embodiments described herein. Program product 1100 may include a signal bearing medium 1110. Signal bearing medium 1110 may include one or more instructions 1120 that, when executed by, for example, a processor, may provide the functionality described above with respect to FIGS. 1-10. By way of example, instructions 1120 may include: one or more instructions for receiving a first level of signal and a second level of signal from a base station during a first time slot; one or more instructions for transmitting the second level of signal to a second user equipment during a second time slot. Thus, for example, referring to FIG. 4, first user equipment 410 may undertake one or more of steps shown in FIG. 5 in response to instructions 704.

Further, by way of example, instructions 1120 may include: one or more instructions for transmitting a first level of signal and a second level of signal to a plurality of user equipments during a first time slot; one or more instructions for receiving a first feedback signal from a first user equipment when the first user equipment does not receive the second level of signal during the first time slot; one or more instructions for adjusting a hierarchical modulation level of the second level of signal; one or more instructions for transmitting the adjusted second level of signal to the first user equipment during a second time slot. Thus, for example, referring to FIG. 7, base station 700 may undertake one or more of steps shown in FIG. 7 in response to instructions 704.

In some implementations, signal bearing medium 1110 may encompass a computer-readable medium 1130, such as, but not limited to, a hard disk drive, a Compact Disc (CD), a Digital Versatile Disk (DVD), a digital tape, memory, etc. In some implementations, signal bearing medium 1110 may encompass a recordable medium 1140, such as, but not limited to, memory, read/write (R/W) CDs, R/W DVDs, etc. In some implementations, signal bearing medium 1110 may encompass a communications medium 1150, such as, but not limited to, a digital and/or an analog communication medium (e.g., a fiber optic cable, a waveguide, a wired communications link, a wireless communication link, etc.). Thus, for example, program product 1100 may be conveyed to one or more modules of first user equipment 410 and base station 700 by an RF signal bearing medium 1110, where signal bearing medium 1110 is conveyed by a wireless communications medium 1150 (e.g., a wireless communications medium conforming with the IEEE 802.11 standard).

FIG. 12 is a block diagram illustrating an example computing device 1200 that can be utilized to provide multicasting services in accordance with at least some embodiments described herein. In a very basic configuration 1202, computing device 1200 typically includes one or more processors 1204 and a system memory 1206. A memory bus 1208 may be used for communicating between processor 1204 and system memory 1206.

Depending on the desired configuration, processor 1204 may be of any type including but not limited to a microprocessor ($\mu P$), a microcontroller ($\mu C$), a digital signal processor (DSP), or any combination thereof. Processor 1204 may include one more levels of caching, such as a level one cache 1210 and a level two cache 1212, a processor core 1214, and registers 1216. An example processor core 1214 may include an arithmetic logic unit (ALU), a floating point unit (FPU), a digital signal processing core (DSP Core), or any combination thereof. An example memory controller 1218 may also be used with processor 1204, or in some implementations memory controller 1218 may be an internal part of processor 1204.

Depending on the desired configuration, system memory 1206 may be of any type including but not limited to volatile memory (such as RAM), non-volatile memory (such as ROM, flash memory, etc.) or any combination thereof. System memory 1206 may include an operating system 1220, one or more applications 1222, and program data 1224.

Computing device 1200 may have additional features or functionality, and additional interfaces to facilitate communications between basic configuration 1202 and any required devices and interfaces. For example, a bus/interface controller 1230 may be used to facilitate communications between basic configuration 1202 and one or more data storage devices 1232 via a storage interface bus 1234. Data storage devices 1232 may be removable storage devices 1236, non-removable storage devices 1238, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1206, removable storage devices 1236 and non-removable storage devices 1238 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1200. Any such computer storage media may be part of computing device 1200.

Computing device 1200 may also include an interface bus 1240 for facilitating communication from various interface devices (e.g., output devices 1242, peripheral interfaces 1244, and communication devices 1246) to basic configuration 1202 via bus/interface controller 1230. Example output devices 1242 include a graphics processing unit 1248 and an audio processing unit 1250, which may be configured to communicate to various external devices such as a display or speakers via one or more A/V ports 1252. Example peripheral interfaces 1244 include a serial interface controller 1254 or a parallel interface controller 1256, which may be configured to communicate with external devices such as input devices (e.g., keyboard, mouse, pen, voice input device, touch input device, etc.) or other peripheral devices (e.g., printer, scanner, etc.) via one or more I/O ports 1258. An example communication device 1246 includes a network controller 1260, which may be arranged to facilitate communications with one or more other computing devices 1262 over a network communication link via one or more communication ports 1264.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1200 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1200 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method, comprising:
receiving, by a second user equipment, a first level of signal and/or a second level of signal from a base station during a first time slot, wherein the first level of signal is modulated based on a first modulation method and the second level of signal is modulated based on a second modulation method;
when the second user equipment receives the first level of signal from the base station during the first time slot:
transmitting, by the second user equipment, a first feedback signal to the base station, wherein the transmitted first feedback signal indicates that the second user equipment did not receive the second level of signal; and
receiving, by the second user equipment, a transmission from a first user equipment that is responsive to the transmitted first feedback signal, wherein the transmission from the first user equipment includes transmission of at least the second level of signal to the second user equipment during a second time slot, and wherein the first level of signal and the second level of signal are received by the first user equipment during the first time slot; and
when the second user equipment receives both the first level of signal and the second level of signal during the first time slot:
transmitting, by the second user equipment, a second feedback signal to the base station, wherein the transmitted second feedback signal indicates that the second user equipment received both the first level of signal and the second level of signal.

2. The method of claim 1, wherein a SINR value of a channel of the second user equipment is lower than a predetermined value.

3. The method of claim 1, wherein the receiving the first level of signal and/or the second level of signal from the base station is based on a scalable video coding method.

4. The method of claim 1, wherein the first level of signal and the second level of signal are modulated based on a hierarchical modulation method.

5. The method of claim 4, wherein the first level of signal is modulated based on a QPSK modulation method and the second level of signal is modulated based on a 16 QAM modulation method.

6. A method performed under control of a base station, the method comprising:
transmitting a first level of signal and a second level of signal to a plurality of user equipment during a first time slot, wherein the first level of signal is modulated based on a first modulation method and the second level of signal is modulated based on a second modulation method;
when a first user equipment, of the plurality of user equipment, receives the first level of signal from the base station during the first time slot:
receiving a first feedback signal from the first user equipment during the first time slot,
wherein the received first feedback signal indicates that the first user equipment did not receive the second level of signal;
in response to the received first feedback signal, adjusting a hierarchical modulation level of at least the second level of signal; and
transmitting the adjusted second level of signal to the first user equipment during a second time slot; and
when the first user equipment does not receive both the first level of signal and the second level of signal during the first time slot:
receiving a second feedback signal from the first user equipment during the first time slot; and
adjusting, based on the received second feedback signal, a quantity of resources that are assigned to the second time slot.

7. The method of claim 6, wherein the transmitting the first level of signal and the second level of signal are based on a scalable video coding method.

8. The method of claim 6, wherein the first level of signal and the second level of signal are modulated based on a hierarchical modulation method.

9. The method of claim 8, wherein the first level of signal is modulated based on a QPSK modulation method and the second level of signal is modulated based on a 16 QAM modulation method.

10. A base station, comprising:
a transmitting unit configured to transmit a first level of signal and a second level of signal to a plurality of user equipment during a first time slot, wherein the first level of signal is modulated based on a first modulation method and the second level of signal is modulated based on a second modulation method;
a receiving unit configured to:
receive a first feedback signal from a user equipment, of the plurality of user equipment, during the first time slot when the user equipment receives the first level of signal from the base station during the first time slot,
wherein the received first feedback signal indicates that the user equipment did not receive the second level of signal; and
receive a second feedback signal from the user equipment during the first time slot when the user equipment does not receive both the first level of signal and the second level of signal during the first time slot; and
an adjusting unit configured to:
adjust a hierarchical modulation level of the second level of signal in response to the received first feedback signal; and
adjust a quantity of resources that are assigned to a second time slot in response to the received second feedback signal,
wherein the transmitting unit is further configured to transmit the adjusted second level of signal to the user equipment.

11. The base station of claim 10, wherein the received second feedback signal indicates that the user equipment does not receive both of the first level of signal and the second level of signal.

12. The base station of claim 10, wherein the first level of signal and the second level of signal are transmitted based on a scalable video coding method.

13. The base station of claim 10, wherein the first level of signal and the second level of signal are modulated based on a hierarchical modulation method.

14. A non-transitory computer-readable storage medium having stored thereon computer-executable instructions that, in response to execution, cause user equipment to perform operations, comprising:
receiving, by a second user equipment, a first level of signal and/or a second level of signal from a base station during a first time slot, wherein the first level of signal is modulated based on a first modulation method and the second level of signal is modulated based on a second modulation method;
when the second user equipment receives the first level of signal from the base station during the first time slot:
transmitting, by the second user equipment, a first feedback signal to the base station, wherein the transmitted first feedback signal indicates that the second user equipment did not receive the second level of signal; and
receiving, by the second user equipment, a transmission from a first user equipment that is responsive to the transmitted first feedback signal, wherein the transmission from the first user equipment includes transmission of at least the second level of signal to the second user equipment during a second time slot, and wherein the first level of signal and the second level of signal are received by the first user equipment during the first time slot; and
when the second user equipment receives both the first level of signal and the second level of signal during the first time slot:
transmitting, by the second user equipment, a second feedback signal to the base station, wherein the transmitted second feedback signal indicates that the second user equipment received both the first level of signal and the second level of signal.

15. A non-transitory computer-readable storage medium having stored thereon computer-executable instructions that, in response to execution, cause a base station to perform operations, comprising:
transmitting a first level of signal and a second level of signal to a plurality of user equipment during a first time slot, wherein the first level of signal is modulated based on a first modulation method and the second level of signal is modulated based on a second modulation method;
when a first user equipment, of the plurality of user equipment, receives the first level of signal from the base station during the first time slot:
receiving a first feedback signal from the first user equipment during the first time slot,
wherein the received first feedback signal indicates that the first user equipment did not receive the second level of signal;
in response to the received first feedback signal, adjusting a hierarchical modulation level of the second level of signal; and
transmitting the adjusted second level of signal to the first user equipment during a second time slot; and
when the first user equipment does not receive both the first level of signal and the second level of signal during the first time slot:
receiving a second feedback signal from the first user equipment during the first time slot; and
adjusting, based on the received second feedback signal, a quantity of resources that are assigned to the second time slot.

* * * * *